United States Patent [19]

Duvall et al.

[11] Patent Number: 4,742,450
[45] Date of Patent: May 3, 1988

[54] METHOD TO SHARE COPY ON WRITE SEGMENT FOR MAPPED FILES

[75] Inventors: Keith E. Duvall, Georgetown; Anthony D. Hooten, Round Rock; Larry K. Loucks, Austin, all of Tex.

[73] Assignee: International Business Machines Corporation, Armonk, N.Y.

[21] Appl. No.: 819,455

[22] Filed: Jan. 16, 1986

[51] Int. Cl.⁴ .................................... G06F 12/08
[52] U.S. Cl. .................................... 364/200
[58] Field of Search ... 364/200 MS File, 900 MS File

[56] References Cited

U.S. PATENT DOCUMENTS

| 4,135,240 | 1/1979 | Ritchie | 364/200 |
| 4,435,752 | 3/1984 | Winkelman | 364/200 |
| 4,625,081 | 11/1986 | Lotito et al. | 379/196 X |

Primary Examiner—Archie E. Williams, Jr.
Assistant Examiner—Florin Munteanu
Attorney, Agent, or Firm—Richard E. Cummins

[57] ABSTRACT

A method for facilitating the interchange of data in a UNIX* file between two UNIX processes being run concurrently on two virtual machines in a page segmented virtual memory virtual machine type data processing system. A Shared Copy-On-Write (SCOW) command is created for the UNIX type operating system which when executed in response to a system call from one processes causes the specified UNIX file to be mapped to a unique segment of the virtual memory. A map node data structure is established for storing the ID of the unique segment and for maintaining a count value of the number of user sharing the unique segment. A system call to the SCOW command by the second process involving the same UNIX file checks the map node data structure to see if the file is currently mapped for the SCOW mode. Subsequent instructions in the application programs which are run concurrently on the virtual machines operate on the copy of the file in the unique segment so that any data that is changed, i.e. written by one process, is available to be read by the second process.

UNIX is a Trademark of AT&T.

6 Claims, 9 Drawing Sheets

FLOW CHART OF
MAP PAGE
RANGE SERVICE

METHOD TO SHARE COPY ON WRITE SEGMENT FOR MAPPED FILES

TECHNICAL FIELD

The invention relates in general to methods for controlling access to data stored in a virtual memory of a multi-user information handling system which is being run under a UNIX* type operating system. The invention relates, in particular, to a method which permits a user to gain access to a file stored in a virtual memory segment in order to update it, even though another user has previously requested access to the same virtual memory segment of the file and is in the process of currently updating that segment.

*Unix is a trademark of A.T. & T.

CROSS-REFERENCED APPLICATIONS

U.S. application Ser. No. 06/819,458 filed concurrently herewith in the name of Duvall et al, entitled "Method to Control I/O Access in a Multi-Tasking, Virtual Memory, Virtual Machine Type Data Processing System" is directed to a method for use in a multi-user paged segmented virtual memory data processing system in which a mapped file data structure is selectively created to permit all I/O operations to the secondary storage devices to be executed by simple load and store instructions under the control of the page fault handler.

BACKGROUND ART

The prior art discloses various multi-user virtual memory information handling systems. In general, a virtual memory system implies a system having a main memory that is relatively fast, but somewhat limited in capacity, because of its cost, and a backing store device which is relatively slow, but is rather large, since the cost of storage per bit is relatively inexpensive. Implicit also in a virtual memory system is a paging system which functions to control the transfer of data between the main memory and the backing store. In practice, the main memory is generally a semiconductor memory array, while the backing store is generally one or more disk drives or files, some of which may even allow the media to be replaced by an operator.

The main memory has its own arrangement for defining real address storage locations, as does the disk storage subsystem. The system, therefore, employs a virtual address when requesting data from storage. The Virtual Memory Manager (VMM) has the responsibility to check that the data at the virtual address is in main memory and if not, to transfer the data to main memory from the backing store. The specific manner in which the Virtual Memory Manager accomplishes the transfer varies significantly among the prior art systems, primarily because of the inherent characteristics of the specific hardware, including the conventions adopted for defining real addresses of the storage devices and also because of the differences in the operating systems under which the hardware is being run.

The motivation for creating a virtual memory type system is based primarily on the realization that the cost of providing real memory for the system of a size that would support either one complex program, or a number of smaller programs which could be run concurrently by one or more users, is prohibitive. Further, since generally there is no real reason for having the entire program resident in main memory, it would be more cost effective to store the program data on less expensive disk file backing stores and "page" portions of the data and program into main memory, as required. The paging process, when conducted by the Virtual Memory Manager, does not significantly impact the overall system performance, since the main processor can switch to another task or process which has previously been paged into main memory.

The prior art virtual memory systems employ various operating systems since an operating system is generally designed to take advantage of the architecture of the processing unit and a particular application or environment. Some operating systems, such as PC DOS, for the family of IBM Personal Computers (PCs) and compatibles, is designed primarily for a single user environment. On the other hand, the UNIX operating system is designed primarily for a multi-user environment. The use of the UNIX operation system has, for a number of technical and non-technical reasons, been somewhat restricted to particular systems. As a result, the number of application programs that are run under a UNIX operating system have, until recently, been also rather limited. Multi-user UNIX systems employing virtual memory have even been more limited.

The manner in which UNIX implements System Calls, particularly to storage, is in many respects quite advantageous to system performance. In UNIX, the System Call is the interface between UNIX and an application program. A System Call by the application program requests the "kernel" portion of the UNIX operating system to perform one particular task or service on behalf of the operating system. The "kernel" portion of UNIX includes approximately 60 System Calls which are not changed between different hardware systems, and are the standard interface to UNIX. Other programs in UNIX adopt the kernel to the particular hardware environment.

UNIX has a unique file system for managing data stored on the systems' external storage devices, e.g., disk files. While UNIX allows a file to be accessed by many different concurrent users, if the file is to be updated, additional System Calls are required in order to insure that the updating occurs in a serial fashion. These additional System Calls function to lock portions of the file temporarily, reserving that area for the exclusive use of the calling program that is to do the updating. This does require involvement by the "kernel" in the locking and unlocking tasks and, hence, has an adverse effect on overall system performance. The prior art non-virtual UNIX systems do, nevertheless, permit the concurrent use of the same file by different users. The ability to share a portion of the same file among various users is advantageous for interprogram or interprocess communication, in that once the portion of the file is updated by one program, the data is immediately available to all the other programs or processes that are sharing that segment. The term "process," in UNIX terminology, means simply a program that it is currently executing.

The memory management function of a typical UNIX operating system is a part of the UNIX kernel and generally is unique for each different Central Processing Unit. Some processing units require the total program to be in memory before any portion of the program can be run. Other CPUs can begin execution of a program while only a small portion is in active memory. The first memory management technique is referred to as "swapping," in that different processes or programs are run for a given period of time and then the entire program is "swapped" out for another program. The second technique is the Virtual Memory technique, which implies that provision must be made for the memory management function to handle page faults, so that defined portions or pages of the program can be brought into main memory as needed and returned to the back-up store when the pages are no longer required.

If the Virtual Memory Management function is left with the kernel of the UNIX operating system, the page fault mechanism will consume a considerable portion of the CPU operating time. As a result, prior art virtual memory systems generally prefer to establish a Virtual Memory Management function as a separate level of programming on a device whose primary function is memory management. The page fault mechanism is then a part of the memory manager, and the CPU is free from time-consuming tasks of controlling the paging operation.

In the cross-referenced application Ser. No. 819,458, a virtual memory data processing system is disclosed in which virtual machines are established by a Virtual Resource Manager which provides each virtual machine with a large virtual memory. In that system, to avoid the potential conflicts that arise in some virtual memory systems between the operating system's request for I/O disk storage operations and I/O disk storage operations controlled by the page fault handler, the responsibility for performing all I/O disk storage operations was assigned solely to the page fault handling mechanism. In addition, the normal UNIX interface to the application program by System Calls was supplemented by a mapped page technique. This latter technique permitted the application program to employ simple load and store type instructions to address memory, rather than tie up the system processor in executing UNIX System Calls to the disk storage. Any file stored in a defined segment of virtual memory could be mapped at the request of the application program which, in effect, established a table of virtual addresses and assigned disk block addresses for each page of data that was in the defined segment of virtual memory assigned to that file. The table or map was stored in a separate "segment" of the virtual memory.

The "kernel" of the UNIX operating system was enhanced to provide a new System Call designated "SHMAT_MAP." The conventional UNIX operating system includes a variety of "SHMAT" System Calls, each with a slightly different function, such as (1) read only, (2) read/write, (3) copy_on_write, etc. The SHMAT_MAP command was also provided with the corresponding functions.

Since the system described in the cross-referenced application was designed to operate with applications previously written for a conventional UNIX operating system, all UNIX System Calls had to be supported. The support is transparent to the user, in that any conventional UNIX System Call from an application program to the UNIX kernel is effectively intercepted by the Memory Manager, which then assigns the tasks to the page fault mechanism. Thus, in that system, the SHMAT_MAP command further specified whether the file was to be mapped, read/write (R/W), read only (RO), or copy_on_write (CW). The copy_on_write function in UNIX allows a file in system memory to be changed. When the CW file is paged out of real memory, it does not replace the permanent file. A separate System Call is required for the copy_on_write file, which is usually in a disk cache, to replace the permanent copy of the file in the secondary storage device. Two users who concurrently map a file read/write or read only share the same mapped segment. However, each user who requests to map the same file, copy_on_write, at the same time, create their own private copy_on_write segment. The term segment implies a section of the virtual address space. Each user is permitted to have only one CW segment for a given file at one time. The system of the cross-referenced application, therefore, is fully compatible with the prior art UNIX approach for shared files.

This aspect of the common design, however, perpetuates the problem which exists with UNIX files, in that the sharing of a mapped file CW segment by multiple users is prohibited. The capability of multiple users sharing the same mapped file copy_on_write segment is highly desirable, and a method of achieving that function in systems of the type described in the cross-referenced application is the subject of the present invention.

SUMMARY OF THE INVENTION

In accordance with the method of the present invention, an additional System Call flag is created for the "SHMAT" type System Calls. When this flag is specified by the user in combination with the System Call for a copy_on_write segment, a common copy_on_write segment is created for the mapped file.

The first user to request the shared copy_on_write segment for the file causes creation of a common mapped file copy_on_write segment. The segment ID for this segment would then be saved in a data structure such as the inode data structure for the UNIX file, so that any future request for the shared copy_on_write segment for the mapped file causes the common copy_on_write segment to be used.

Also saved in the inode structure is a reference counter, used to indicate how many users currently have access to the shared segment (CW). Each request for the shared copy_on_write segment for the file causes the counter to be incremented and each closing of the file descriptor by a user accessing the file reference by the file descriptor via the copy_on_write segment causes the counter to be decremented. Every time the counter is decremented, a check is made to see if the counter has become zero, and if so, the shared copy_on_write segment is destroyed so that a future request for a shared copy_on_write segment for the file causes a new shared copy_on_write segment to be traded (and a new segment ID placed in the inode structure for the file).

All existing mapped file features continue to be supported, as described in the cross-referenced application; (1) whenever a file is mapped there exists a read/write segment for the mapped file, so that read or write System Calls reference the file by the mapped file read/write segment; (2) the support of private copy_on_write segments is maintained so that a user can still continue to request a private copy_on_write version of the file.

It is therefore an object of the present invention to provide an improved method for a number of data processing system users who are concurrently running separate UNIX processes in a page segment virtual memory environment to share a copy of the file in the same segment of virtual memory.

A further object of the present invention is to provide an improved method for users in a virtual memory data processing system running a UNIX type operating system to concurrently share a file that has been designated copy_on_write by a SHMAT type UNIX System Call.

A further object of the present invention is to provide a new method for permitting users of a UNIX operating system to concurrently share a file that has been opened by a shared copy_on_write UNIX System Call by employing the same mapped copy_on_write segment of the virtual memory.

Objects and advantages other than those mentioned above will become apparent from the following description, when read in connection with the drawing.

DESCRIPTION OF THE PREFERRED EMBODIMENT

Figure 1:
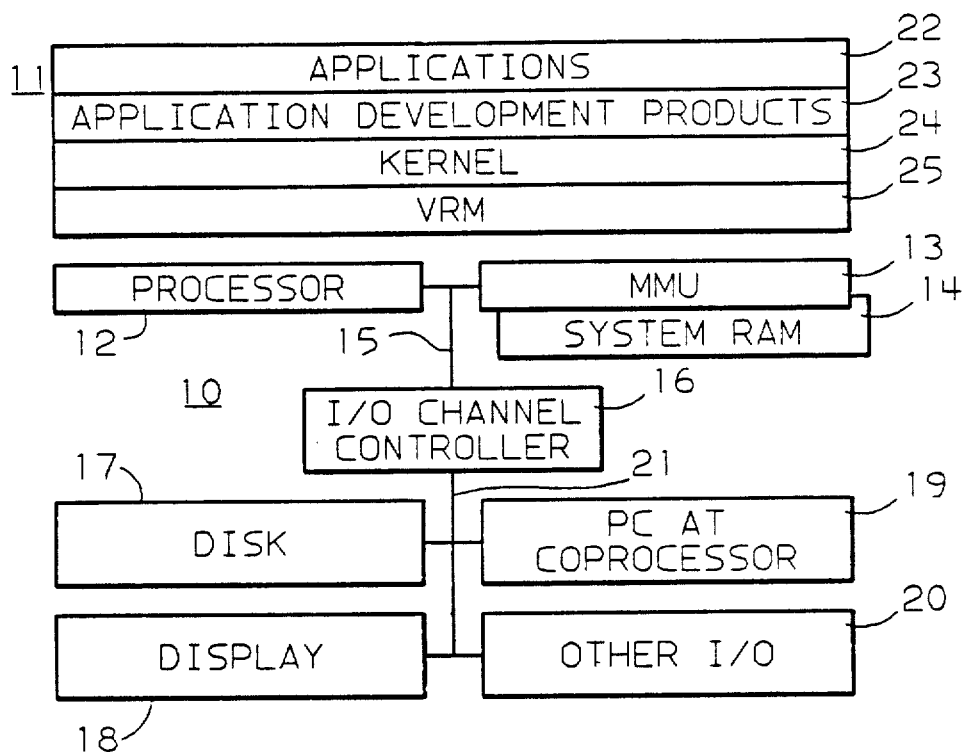
FIG. 1 is a schematic illustration of a virtual memory system in which the method of the present invention may be advantageously employed.

System Overview: FIG. 1 is a schematic illustration of a virtual memory system in which the method of the present invention is employed. As shown in FIG. 1., the system comprises a hardware section 10 and a software or programming section 11. Hardware section 10, as shown, comprises a processor function 12, a memory management function 13, a system memory function or RAM 14, system bus 15, an Input/Output Channel Controller (IOCC) 16, and an Input/Output bus 21. The hardware section further includes a group of I/O devices attached to the I/O bus 21 through the IOCC 16, including a disk storage function 17, a display function 18, a co-processor function 19, and block 20, representing other I/O devices such as a keyboard or mouse-type device.

The program section of the system includes the application program 22 that is to be run on the system, a group of application development programs 23, or tools to assist in developing new applications, an operating system kernel 24, which, for example, may be an extension of the UNIX system V kernel, and a Virtual Resource Manager program 25, which functions to permit a number of virtual machines to be created, each of which is running a different operating system, but sharing the system resources. The system may operate, therefore, in a multi-tasking, multi-user environment which is one of the main reasons for requiring a large virtual memory type storage system.

Figure 2:
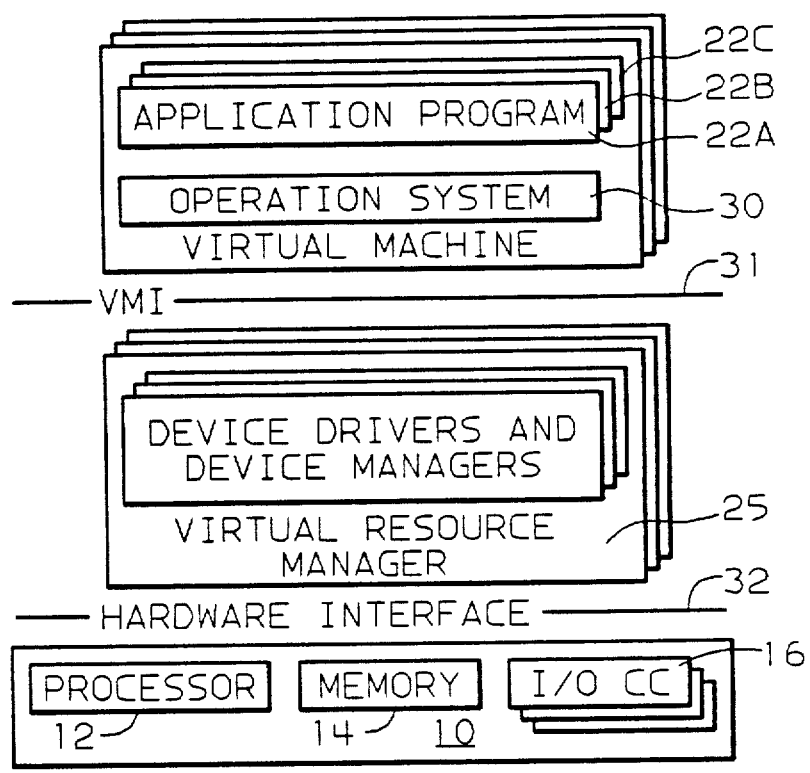
FIG. 2 illustrates the interrelationship of the Virtual Resource Manager shown in FIG. 1 to the data processing system and a virtual machine.
Figure 3:
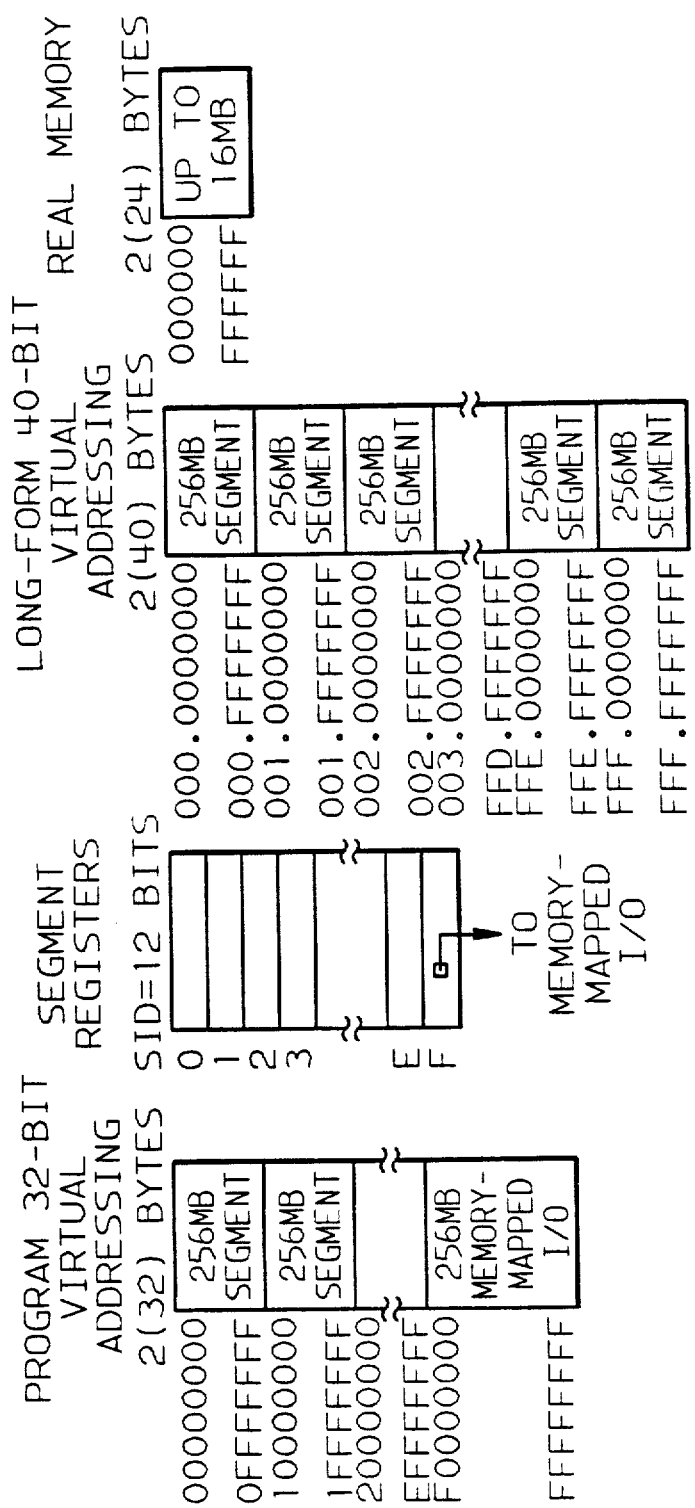
FIG. 3 illustrates the virtual storage model for the system shown in FIG. 1.

FIG. 2 illustrates the relationship of the Virtual Resource Manager 25 to the other components of the system. As shown in FIG. 2, a virtual machine includes one or more application programs such as 22a-22c and at least one operating system 30. A virtual machine interface 31 is established between the virtual machine and the VRM 25. A hardware interface 32 is also established between the VRM 25 and the hardware section 10. The VRM 25 supports virtual memory. It can be assumed, for purposes of explanation, that the memory capabilities of the hardware shown in FIG. 1 includes a 24 bit address space for system memory 14, which equates to a capacity of 16 megabytes for memory 14, and a 40 bit address space for virtual memory, which equates to 1 terrabyte of memory. A paged segmentation technique is implemented for the Memory Management Unit 13, so that the total virtual address space is divided into 4,096 memory segments, with each memory segment occupying 256 megabytes. FIG. 3 illustrates the virtual storage model. The processor 12 provides a 32 bit effective address which is specified, for example, by the application program. The high order 4 bits of the 32 bit address functions to select 1 of 16 segment registers which are located in the Memory Management Unit (MMU) 13. Each segment register contains a 12 bit segment ID section, along with other special control-type bits. The 12 bit segment ID is concatenated with the remaining 28 bits of the initial effective address to provide the 40 bit virtual address for the system. The 40 bit virtual address is subsequently translated to a 24 bit real address, which is used to address the system memory 14.

Figure 4:
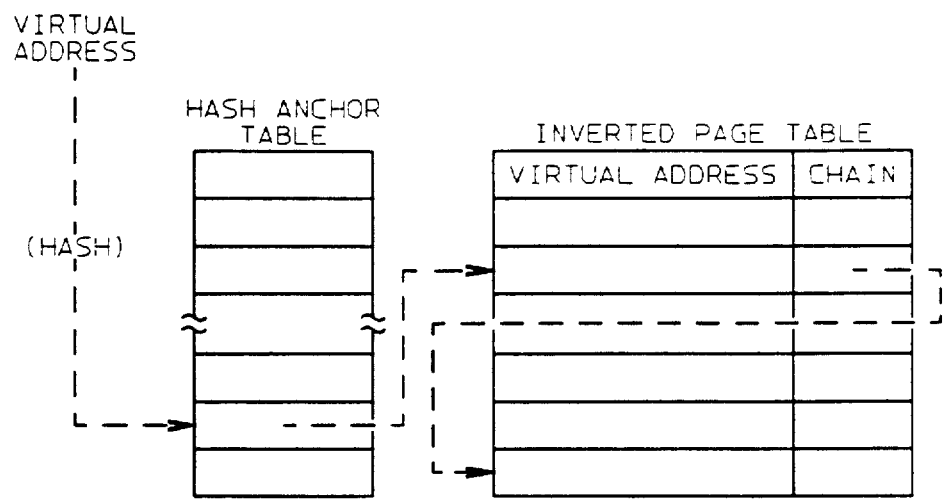
FIG. 4 illustrates conceptually, the address translation function of the system shown in FIG. 1.
Figure 5:
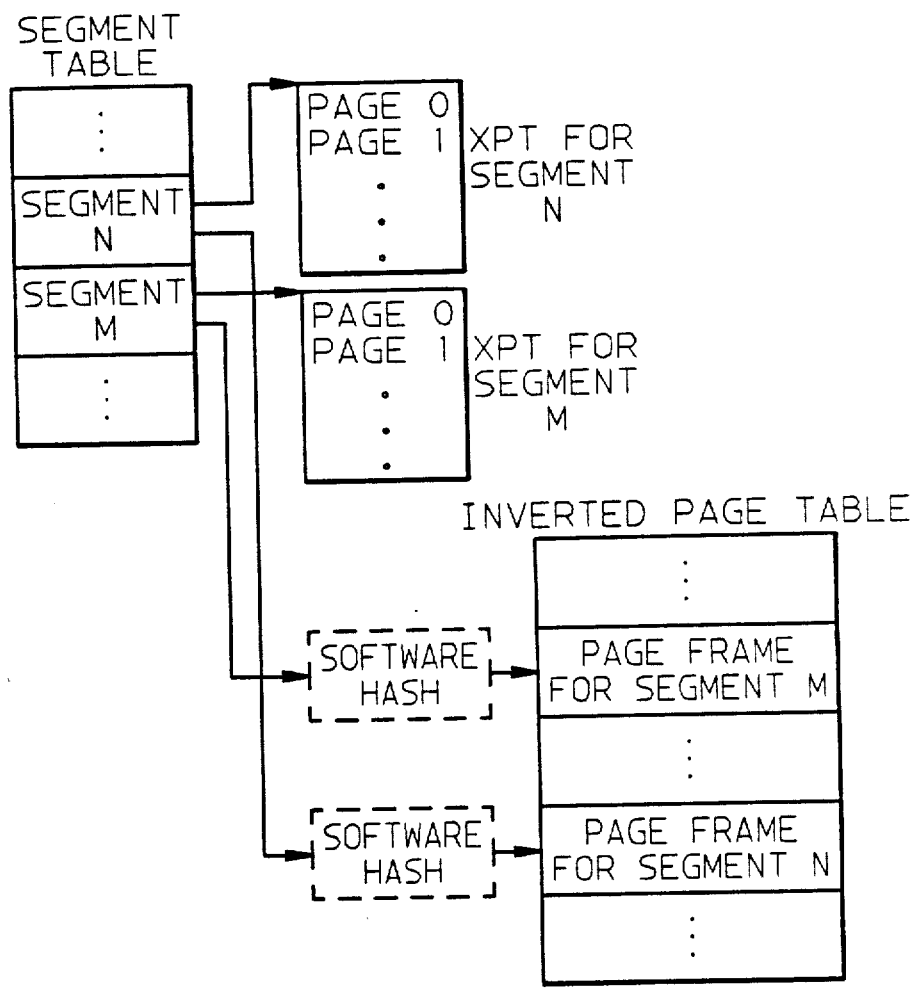
FIG. 5 illustrates the interrelationships of some of the data structures employed in the system of FIG. 1.

The MMU 13 utilizes a Translation Look-aside Buffer (TLB) to contain translations of the most recently used virtual addresses. Hardware is used to automatically update TLB entries from main storage page tables as new virtual addresses are presented to the TLBs for translation. FIG. 4 illustrates conceptually, the TLB reload function.

The 40 bit virtual addresses are loaded into the TLB by looking them up in an Inverted Page Table (IPT), as shown in FIG. 4. The table is "inverted" because it contains one entry for each real memory page, rather than one per virtual page. Thus, a fixed portion of real memory is required for the IPT, regardless of the number of processes or virtual segments supported. To translate an address, a hashing function is applied to the virtual page number (high order part of the 40 bit virtual address, less the page offset) to obtain an index to the Hash Anchor Table (HAT). Each HAT entry points to a chain of IPT entries with the same hash value. A linear search of the hash chain yields the IPT entry and, thus, the real page number which corresponds to the original 40 bit virtual address. If no such entry is found, then the virtual page has not been mapped into the system, and a page fault interrupt is taken.

The function of the Page Fault Handler (PFH) is to assign real memory to the referenced virtual page and to perform the necessary I/O to transfer the requested data into the real memory. The system is, thus, a demand paging type system.

When real memory becomes full, the PFH is also responsible for selecting which page of data is paged out. The selection is done by a suitable algorithm such as a clock page replacement algorithm, where pages are replaced based on when the page was last used or referenced. Pages are transferred out to disk storage.

Figure 6:
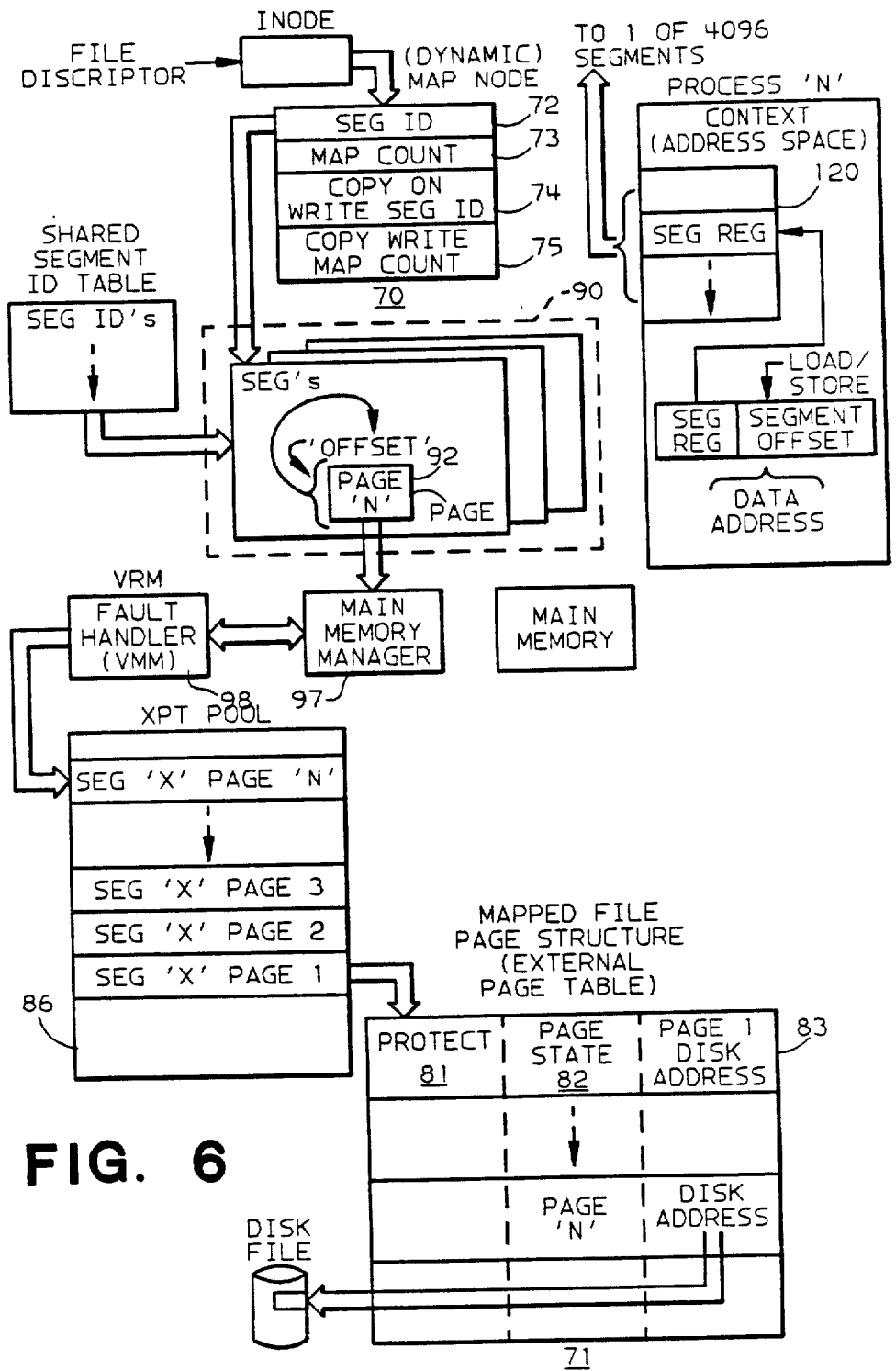
FIG. 6 illustrates the interrelationship of a number of data structures to the Virtual Resource Manager, the virtual memory, and real memory.

The details of the other data structures employed by the system shown in FIGS. 1 and 2 are set forth in the cross-referenced application, particularly Ser. No. 819,458, which is herein incorporated by reference. Similarly, the data structures which were unique to the map file service function of that application are also employed in the method of the present invention. Reference should be made to FIG. 6, specifically to the map node data structures 70 and 71. These two structures are described in detail in the cross-referenced application. The copy_on_write segment field 74 and the copy_on_write map count field 75 are the two specific fields of the map node data structure employed in the method of the present invention to permit concurrent use of a copy_on_write segment.

Figure 7A:
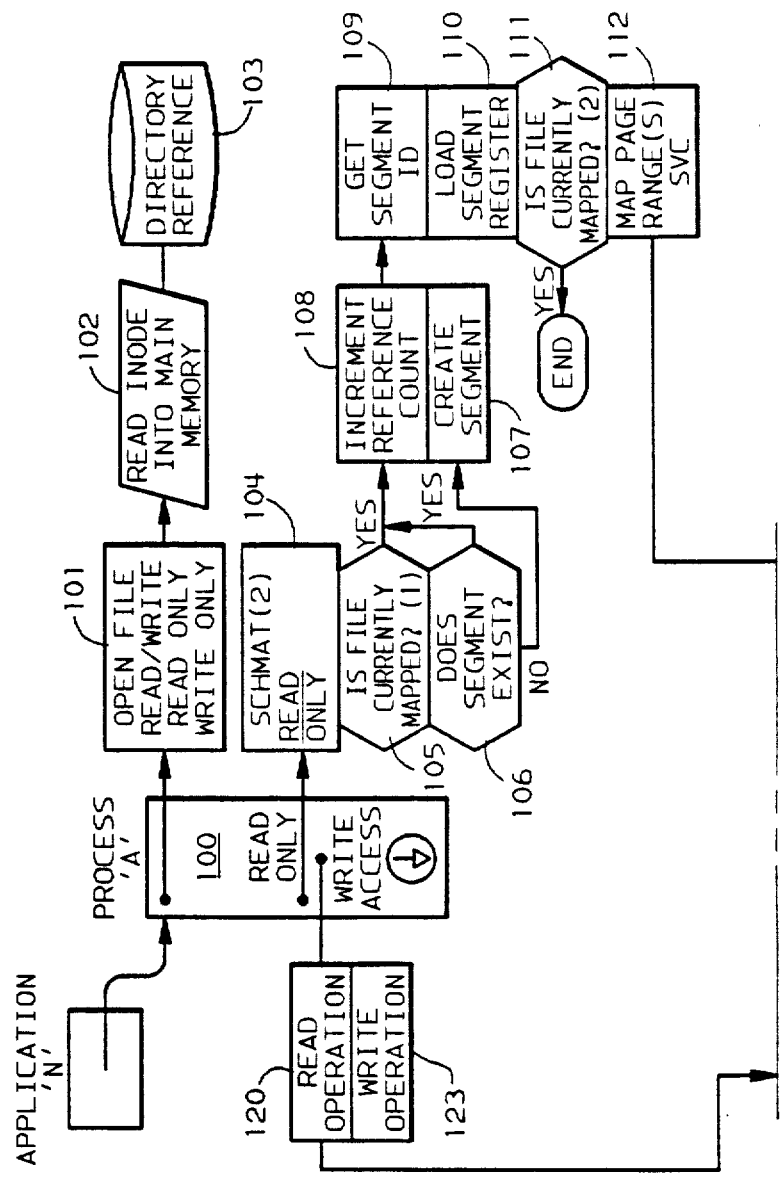
FIGS. 7A and 7B show a flow chart, illustrating the operation of mapping a file copy_on_write.
Figure 7B:
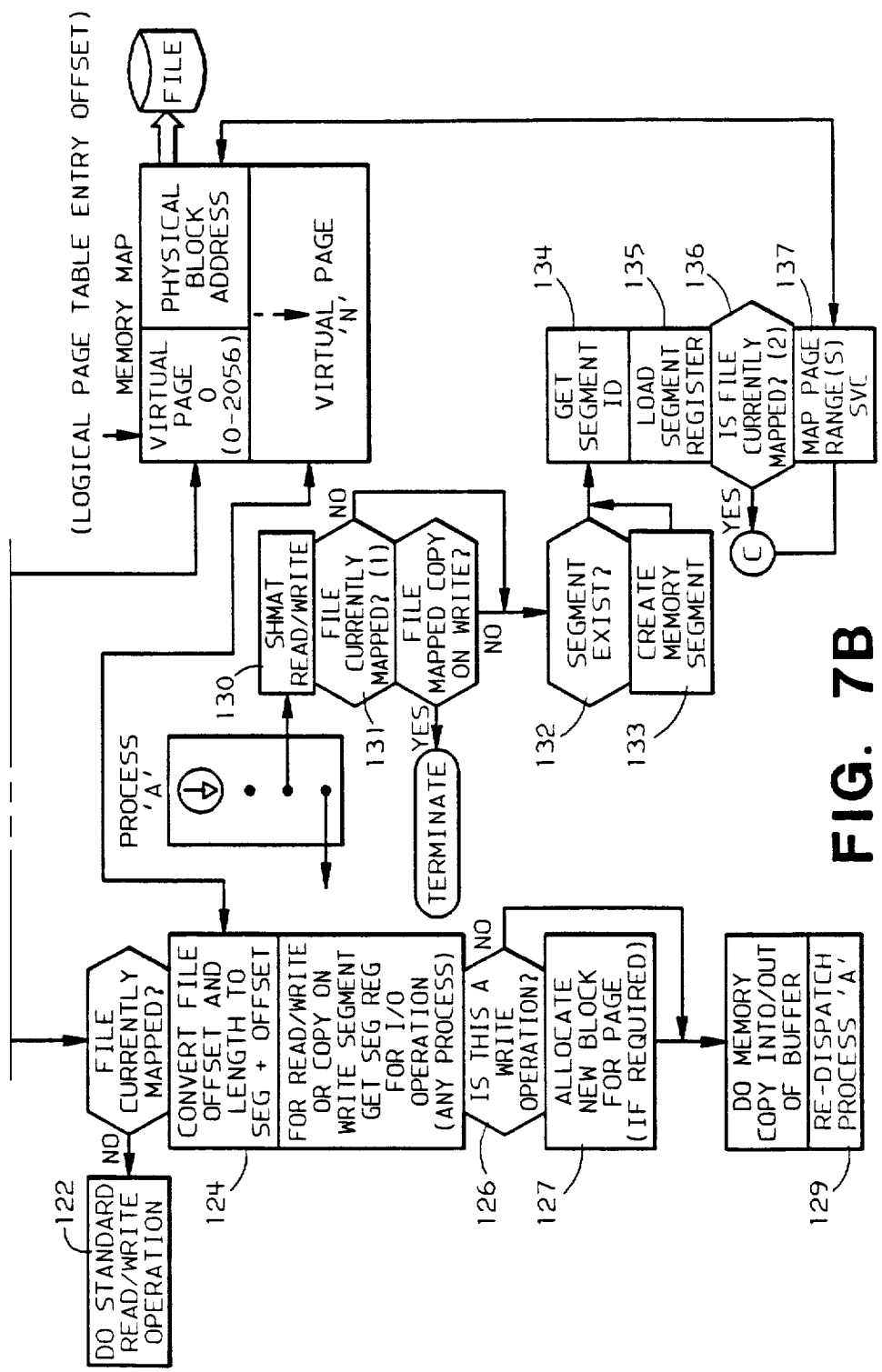

FIGS. 7A and 7B show a flow chart, illustrating the operation of the mapping of the file copy_on_write by an application. The application initiates a process that issues an SHMAT_COPY_ON_WRITE instruction as indicated by block 100.

Block 101 determines if the file is currently mapped read/write, by checking the inode data structure. If the file is currently mapped, the process is terminated at block 102, since protocol does not permit a file to be both mapped copy_on_write and read/write.

If the file is not currently mapped, block 103 tests to determine if the segment exists by checking the inode data structure. If the segment exists, the block 104 tests the map node data structure 70 to determine if a copy_on_write segment exists, block 105 then increments the reference count field 75 in map node 70 by 1 and obtains the segment ID from the map node in block 106. Block 107 loads the segment register with the obtained ID and block 108 tests if the file is currently mapped. Block 109 represents the mapped page range service function which is called to map the file from block 108. If block 108 indicates the segment is mapped copy_on_write, the process ends at block 110. If block 103 indicates that the segment does not exist, block 111 creates the segment by issuing a call to the create segment service of the system. The test in block 104 is then made and if a copy_on_write segment does not exist, a call to the create copy_on_write segment in block 112 is made. The count in the map node field 75 is incremented and the process flow continues, as previously described.

When the process issues a UNIX read system or load instruction in block 115, or a UNIX write System Call or a store instruction in block 116, the operation performs a basic memory reference process, as indicated in block 117. Block 118 tests the Inverted Page Table to determine if a page is in system memory. If not, block 119 allocates a page frame in main memory. This requires an I/O operation in block 120, which halts the process until the page frame is allocated. If block 119 indicates the page is in memory, block 121 tests to see if a read (or load) operation is involved. If so, a request is placed in the I/O queue by block 122.

If a write or store operation is involved, block 123 prepares the page and blocks 124 and 125 prepare the system to receive the copy_on_write page in a paging space allocation on the disk file for copy_on_write pages. These operations require I/O to the disk file and, therefore, they are queued by block 122.

Figure 8:
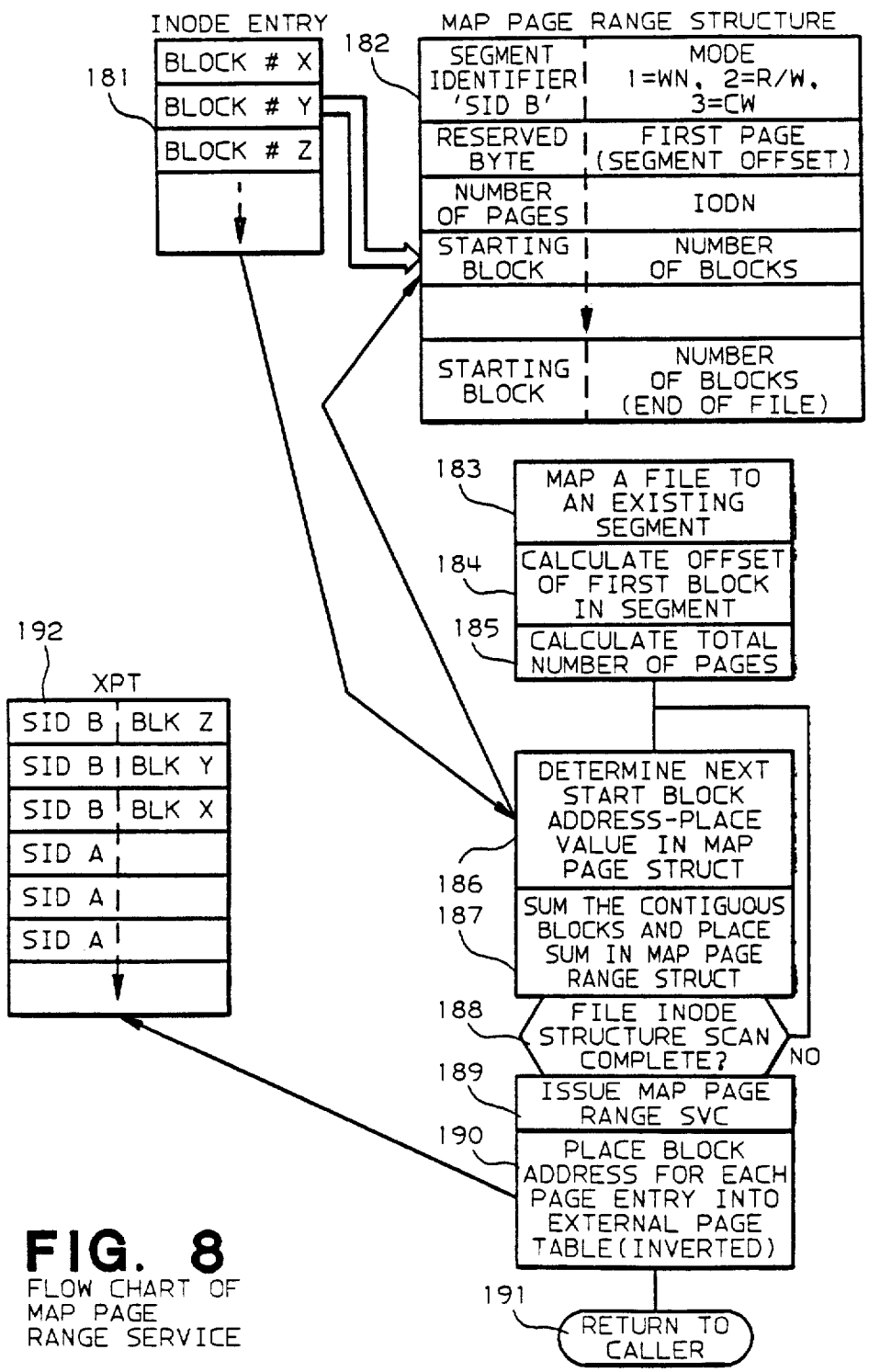
FIG. 8 is a flow chart, illustrating the steps involved in completing the data structures shown in FIG. 6 by a map page range service.

FIG. 8 is a flow chart, illustrating the steps involved by page range service in completing the map node data structure 70 and the mapped file data structure 71, shown in FIG. 6.

After a segment has been created the file must be mapped into the segment. This is a dynamic operation, since the primary storage allocation is virtual, and the segment assignment is transient. As illustrated in FIG. 8 the inode structure 181 is read for the block address of each page to be allocated for the file. Each group of contiguously allocated blocks is summed, and the count recorded in the field adjacent to the starting block number 2 entry in the map page range structure. Discontiguous blocks are reflected in discrete entries in the map page range structure. When the entire file inode structure has been scanned, the map page range SVC is issued and the external page table slot entries for the appropriate segment are updated with the block addresses for each page of the file.

While the invention has been shown and described with reference to a particular embodiment, it should be appreciated by those persons skilled in the art that changes and modifications may be made without departing from the spirit of the invention or the scope of the appended claims.

What is claimed is:

1. A method for facilitating the interchange of data stored in a Unix file between two UNIX processes being run concurrently on two virtual machines in a page segmented virtual memory virtual machine type data processing system having,
    (1) a main memory including,
        a first plurality of byte addressable storage locations each of which functions to store one byte of data,
    (2) a secondary storage device including,
        a second plurality of block addressable storage locations each of which functions to store at least one virtual page of data,
    (3) a virtual resource manager for creating at least first and second virtual machines having a UNIX type Operating System {UOS} program which includes,
        (a) conventional UNIX commands including commands for opening and creating new UNIX files, data transfer commands having parameters for specifying UNIX file data to be transferred between said device and said main memory, a map instruction which functions to map a specified UNIX file stored in said device to virtual pages in another segment of said virtual memory so as to relate the newly assigned page addresses in said another segment to said corresponding block address in said device,
        (b) I/O subroutines which run when said transfer commands are executed,
        (c) means for storing said map instruction at a virtual address in a predetermined segment of said virtual memory, and
        (d) means for storing a UNIX offset pointer,
    (4) an application program which includes conventional Unix system calls to said commands, and
    (5) a memory manager program having,
        (a) Load and Store type of instructions employing a virtual address for transferring a page of data between said device and said main memory,
        (b) a page fault handling mechanism for resolving a page fault that occurs as a result of said application program executing one of said Load and Store instructions involving a virtual page which is not currently stored in said main memory, and (6) means for causing said data transfers defined in said system calls to be made under the control of said memory manager and said page fault handling mechanism, rather than said I/O subroutines of said UOS, including means for dynamically generating another said virtual page address within the address range of said another segment by translating said command parameters and said offset pointer for said specified file in response to each said data transfer command, said method facilitating said interchange of said data between said two processes being run concurrently by said first and second virtual machines involving one specified UNIX File, said method comprising the steps of:

(A) creating a shared-copy-on-write (SCOW) command for said UOS which functions to cause a Unix file specified thereby to be mapped to a unique segment by said map instruction, said SCOW command including a first field for storing an indication to distinguish said SCOW command from a conventional copy-on-write command, (B) executing a system call in a first application program being run by said first virtual machine to said SCOW command to cause said specified file to be mapped to said unique segment, (C) establishing a map node data structure with said UOS which includes the step of establishing a SCOW segment ID field to store the segment ID of said unique segment, (D) storing said unique segment ID in said SCOW segment ID field of said map node data structure in response to mapping said specified file, (E) executing a system call in a second application program to said SCOW command, (F) checking said map node data structure to determine if said specified file is currently mapped in a mode to be shared, and (G) running said first and second application programs concurrently whereby data in said specified file that is written by either application program is readily available to be read by the other application program.

2. The method recited in claim 1 in which said step of establishing said map node data structure further includes the step of establishing a count field for storing a value indicative of the number of virtual machines that currently have access to said unique segment.

3. The method recited in claim 2 further including the step of updating said value in said count field after said step of checking said map node data structure.

4. The method recited in claim 3 in which said step of updating said value includes the step of incrementing said count by one when another virtual machine starts sharing said unique segment and the step of decrementing said count when a virtual machine stops sharing said segment.

5. The method recited in claim 4 further including the step of destroying said unique segment in response to said step of decrementing said value to zero.

6. The method set forth in claim 5 in which said step of running further includes the steps of changing data stored in said unique segment in accordance with instructions being processed by said first virtual machine and reading said changed data in accordance with instructions being processed by said second virtual machine.

* * * * *